൫United States Patent Office൱

3,634,390
Patented Jan. 11, 1972

3,634,390
WATER-SOLUBLE TETRAAZO DYESTUFFS CONTAINING A PYRAZOLONE AND DISULFO-NAPHTHAL GROUP
Karl Sommer, Konigstein, Taunus, and Hennig Bode, Frankfurt am Main, Germany, assignors to Farbwerke Hoechst Aktiengesellschaft vormals Meister Lucius & Bruning, Frankfurt am Main, Germany
No Drawing. Filed Apr. 8, 1969, Ser. No. 814,440
Claims priority, application Germany, Apr. 17, 1968, P 17 69 175.7
Int. Cl. C09b 31/30, 35/30; D06p 1/06
U.S. Cl. 260—159                                  4 Claims

ABSTRACT OF THE DISCLOSURE

Water-soluble polyazo-dyestuffs of the formula

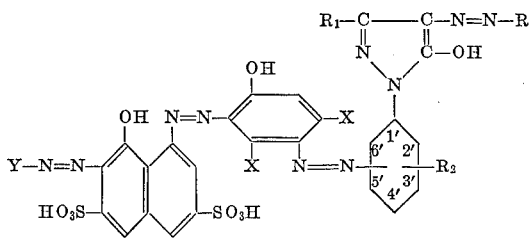

said dyestuffs being easily soluble in water and being suitable for the dyeing of leather and fur suedes, the dyeings obtained on said materials mostly showing a yellowish-brown shade and having a good resistance to acids, a good levelling and penetrating power, and possessing good properties of fastness to water, washing, perspiration, solvents and to light.

---

The present invention relates to new water-soluble and valuable polyazo-dyestuffs of the general formula

Y ⟶

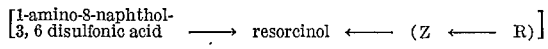

in which Z represents a 1-(3'- or 4'-aminophenyl)-5-pyrazolone carrying in 3-position a methyl or carboxyl group or a carboxyl group esterified with a lower alkanol, preferably with methanol or ethanol, the phenyl radical of which (in 1-position of the pyrazolone nucleus) may furthermore be substituted by a methyl group or a chlorine or bromine atom, and R and Y each stand for aminobenzene that may be substituted in the nucleus by 1 or 2 sulfonic acid groups and/or by sulfomethyl, methyl or methoxy groups or a chlorine or bromine atom, R and Y being identical or different from each other. Furthermore, the present invention provides a process for the manufacture of these polyazo dyestuffs, which comprises combining a diazotized 1-amino-8-naphthol-3,6 disulfonic acid with an alkaline solution of resorcinol, reacting the monoazo dyestuff obtained with the diazotized amino monoazo dyestuff which is obtained by diazotation of aminobenzene that may be substituted in the nucleus by 1 or 2 sulfonic acid groups and/or sulfomethyl, methyl or methoxy groups or a chlorine or bromine atom and combining it with a 1-(3'-respectively 4'-aminophenyl)-5-pyrazolone which carries in 3-position a methyl or carboxyl group or a carboxyl group esterified by means of a lower alkanol, preferably methanol or ethanol, the phenyl radical of which (in 1-position of the pyrazolone nucleus) may furthermore be substituted by a methyl group or a chlorine or bromine atom, and subsequent combining the trisazo dyestuff thus obtained with a diazotized amino benzene, which may be substituted in the nucleus by 1 or 2 sulfonic acid groups and/or by a sulfomethyl, methyl or methoxy group or a chlorine or bromine atom.

More particularly, the claimed dyestuffs correspond to the general formula

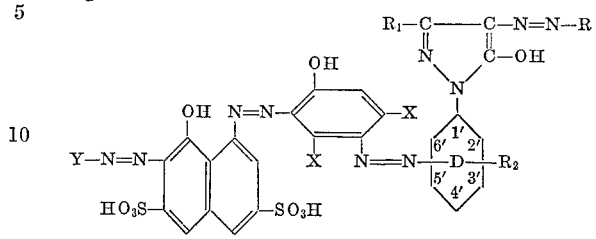

in which R and Y each represents phenyl, monosulfophenylene, methoxyphenylene, mono(sulfomethyl)-phenylene, monosulfomethyl - phenylene, monosulfo - bromophenylene, disulfophenylene or monosulfo-methyl-chlorophenylene, $R_1$ represents methyl, carboxyl or —COO- lower alkyl, $R_2$ represents hydrogen, methyl, chlorine or bromine, the azo grouping on the benzene nucleus D being linked in a position other than ortho to position 1', one X stands for hydrogen and the other X for hydroxyl.

The polyazo dyestuffs obtained according to the invention are easily soluble in water and are especially suitable for dyeing leather and fur suedes. The dyeings, mostly of a yellowish-brown shade, have a good resistance to acids, a good levelling and penetrating power, they possess good properties of fastness to water, washing, perspiration, solvents and light; the dyestuffs are well applied from hard water and have a particularly good fastness to buffing.

The dyestuffs obtainable according to the invention dye box calf and box sides within one hour, where required in the presence of fat-liquoring agents and levelling auxiliary agents, after having been introduced into a bath having a temperature of 50 to 60° C. The dyestuff is then fixed by a subsequent treatment with formic acid.

Corrected grain is dyed by means of spraying of an ammoniacal aqueous ethanolic solution of the dyestuff, to which levelling auxiliary agents may have been added. In the case of leathers with a normal absorption, the dyestuff solution may also be applied with a brush.

Split suedes are dyed for two hours, after a two hours' drumming, by introducing them into a dyestuff solution having a temperature of 55° C., and containing, where required, fat-liquoring agents and levelling auxiliary agents. The product is then fixed with formic acid.

Fur suedes are dyed, after a preliminary treatment with an aqueous ammonia-containing solution, for three hours at a temperature of 25° C., where required by adding auxiliary agents and is then rinsed.

The following examples serve to illustrate the invention, the relationship of parts by weight to parts by volume being the same as that of the kilogram to the litre, but they are not intended to limit it thereto.

EXAMPLE 1

34.1 parts by weight of 1-amino-8-naphthol-3,6-disulfonic acid (mono sodium salt) were dissolved in 100 parts by volume of water and 10 parts by volume of a sodium hydroxide solution having a strength of 33% by weight (the pH-value of the solution being about 8) and 15 parts by volume of a sodium nitrite solution of 40% strength were added to this solution. The mixture was then introduced dropwise, at a temperature of about 20° C., with good stirring, into a mixture consisting of 35 parts by volume of concentrated hydrochloric acid and 100 parts by volume of water. Stirring of the yellow-brown diazo suspension was continued for 30 minutes. During this time, an excess amount of nitrous acid must be present in the solution, which was subsequently eliminated by adding a small amount of solid amidosulfonic acid.

11 parts by weight of resorcin were dissolved in 50 parts by volume of water and poured into the suspension of the diazotized 1-amino-8-naphthol-3,6-disulfonic acid. The pH-value of the monoazo dyestuff solution thus obtained was then adjusted to 10.9 by adding a sodium hydroxide solution having a strength of 33% by weight and the whole stirred for 5 hours at room temperature.

17.3 parts by weight of sulphanilic acid were dissolved in 50 parts by volume of 2 N-sodium hydroxide solution and 50 parts by volume of water. 15 parts by volume of a sodium nitrite solution having a strength of 40% by weight were added thereto, and the mixture was allowed to run into 35 parts by volume of concentrated hydrochloric acid mixed with 100 parts by weight of ice. The mixture was stirred for 10 minutes, the excess amount of nitrous acid destroyed by adding amidosulfonic acid and the diazo suspension thus obtained was used to effect the coupling with 18.9 parts by weight of 1-(3'-aminophenyl)-3-methyl-5-pyrazolone, which had been dissolved in 50 parts by volume of 2 N-sodium hydroxide solution and 50 parts by volume of water. 20 parts by weight of crystallized sodium acetate were added to the solution of the coupling component before combining it with the diazo suspension of the sulphanilic acid. A pH-value of 4 to 5 was obtained, which was increased to 7.0 by the addition of 2 N-sodium hydroxide solution. The solution of the amino monoazo dyestuff thus obtained was stirred for further 3 hours.

15 parts by volume of a sodium nitrite solution having a strength of 40% by weight were added to the solution of the amino monoazo dystuff and the mixture was added dropwise to 50 parts by volume of 5 N-hydrochloric acid and 300 parts by weight of ice. The mixture was stirred for 30 minutes and the excess amount of nitrous acid was subsequently destroyed by the addition of amidosulfonic acid. The diazo suspension of the amino monoazo dyestuff obtained in this manner was poured into the alkaline solution of the monoazo dyestuff. The pH-value was adjusted to 10.9 by adding a sodium hydroxide solution having a strength of 33% by weight. The solution of the trisazo dyestuff was subsequently stirred overnight.

9.3 parts by weight of aniline were dissolved in 150 parts by volume of 2 N-hydrochloric acid. After the addition of 100 parts by weight of ice, 15 parts by volume of a 40% by weight sodium nitrite solution were introduced dropwise. The mixture was stirred for 10 minutes. The nitrous acid in excess was destroyed with amidosulfonic acid.

20 parts by weight of crystallized sodium acetate were added to the solution of the trisazo dyestuff, into which the diazo solution of the aniline was then introduced. After one hour, a pH-value of 6 was obtained. The solution was salted out with 20% by volume of sodium chloride, stirred for another hour and the pH-value was adjusted to 4.0 by using 2 N-hydrochloric acid. After stirring overnight, the dyestuff had precipitated. It was filtered with suction and dried at 60° C. The grey powder obtained dyed leather in yellowish-brown shades of good fastness.

EXAMPLE 2

A weakly alkaline solution of 34.1 parts by weight of 1-amino-8-naphthol-3,6-disulfonic acid in 150 parts by volume of water, 10 parts by volume of concentrated sodium hydroxide solution and 15 parts by volume of a sodium nitrite solution having a strength of 40% by weight was allowed to run into a mixture of ice and hydrochloric acid. A yellow-brown diazo suspension was obtained. With good stirring, a solution of 11 parts by weight of resorcin in 50 parts by volume of water was added to this suspension. The pH-value of the reaction mixture was then adjusted to 10.9 by using concentrated sodium hydroxide solution. The solution of the monoazo dyestuff was then stirred for 5 hours at room temperature.

12.3 parts by weight of 4-anisidine were dissolved in a mixture of 30 parts by volume of concentrated hydrochloric acid and 100 parts by volume of water. At a temperature of about 20° C., 15 parts by volume of a sodium nitrite solution having a strength of 40% by weight were added dropwise, and the whole was stirred for 10 minutes at room temperature. The excess of nitrous acid was then destroyed by the addition of 0.5 part by weight of amidosulfonic acid. The diazo solution obtained in this manner was poured into a solution of 18.9 parts by weight of 1-(4'-aminophenyl)-3-methyl-5-pyrazolone in 100 parts by volume of 1 N-sodium hydroxide solution, to which 20 parts by weight of crystallized sodium acetate had been added before. The pH-value was adjusted to 7.0 by the addition of 2 N-sodium hydroxide solution. The solution of the amino monoazo dyestuff was then stirred for 3 hours.

15 parts by volume of a sodium nitrite solution having a strength of 40% by weight were added to the solution of the amino monoazo dyestuff and the mixture was introduced dropwise into 50 parts by volume of 5 N hydrochloric acid and 300 parts by weight of ice. The mixture was stirred for 30 minutes and the excess of nitrous acid destroyed by the addition of some amidosulfonic acid. The diazo suspension of the amino monoazo dyestuff obtained in this manner was poured into the alkaline solution of the monoazo dyestuff. The pH-value was adjusted to 10.9 by adding a sodium hydroxide solution and the solution of the triazo dyestuffff was stirred overnight.

17.3 parts by weight of sulphanilic acid were diazotized as described in Example 1 and combined with the solution of the trisazo dyestuff, to which 20 parts by weight of crystallized sodium acetate had been added before. After further stirring for one hour, it was salted out with 20 parts by volume of sodium chloride, the pH-value being adjusted to 4.0 by means of 2 N-hydrochloric acid. After stirring overnight, the dyestuff had completely precipitated. It was filtered with suction and dried at 60° C. The grey dyestuff powder dyed leather in yellowish-brown shades of good fastness.

EXAMPLE 3

If, in Example 1, the sulphanilic acid was replaced by 18.7 parts by weight of p-amino-benzylsulfonic acid, this acid was diazotized as described in the said example and the diazo compound obtained was combined with a solution of 21.9 parts by weight of 1-(3'-aminophenyl)-5-pyrazolone-3-carboxylic acid in 100 parts by volume of 1 N-sodium hydroxide solution, a solution of the amino monoazo dyestuff was obtained, which was diazotized, after three hours' stirring, with 15 parts by volume of a sodium nitrite solution having a strength of 40% by weight. The diazo suspension of the amino monoazo dyestuff obtained in this manner was added to the solution of the monoazo dyestuff, which was obtained from 34.1 parts by weight of the mono sodium salt of the 1-amino-8-naphthol-3,6-disulfonic acid and 11 parts by weight of resorcin as described in Example 1. 20 parts by weight of crystallized sodium acetate were subsequently added to the solution of the trisazo dyestuff, the mixture being then united with the diazo compound prepared from 18.7 parts by weight of 2-methylaniline 4-sulfonic acid. It was salted out with 20 parts by volume of sodium chloride.

The precipitated dyestuff was filtered with suction and dried. It dyed leather in yellowish-brown shades having good fastness properties. The grey dyestuff powder was easily soluble in water.

Similar valuable polyazo dyestuffs were obtained when the components Z, R and Y of the general formula had the significance indicated in Table 1. They dyed leather in yellowish-brown shades of good fastness.

TABLE 1

| No. | Z | R | Y |
|---|---|---|---|
| 1 | 1-(3'-amino-4'-methylphenyl)-3-methyl-5-pyrazolone | Aniline-2,4'-disulfonic acid | 4-bromine-aniline-2-sulfonic acid. |
| 2 | 1-(3'-aminophenyl)-5-pyrazolone-3-carboxylic acid ethyl ester | Aniline | 4-anisidine. |
| 3 | do | 2-methyl-aniline-4-sulfonic acid | Aniline-2,4-disulfonic acid. |
| 4 | 1-(3'-chloro-4'-aminophenyl)-3-methyl-5-pyrazolone | Aniline-2-sulfonic acid | Aniline. |
| 5 | 1-(4'-aminophenyl)-3-methyl-5-pyrazolone | 3-chloro-2-aminotoluene-5-sulfonic acid | p-Aminobenzyl-sulfonic acid. |
| 6 | 1-(3'-aminophenyl)-3-methyl-5-pyrazolone | p-Aminobenzyl-sulfonic acid | Aniline. |
| 7 | 1-(3'-aminophenyl)-5-pyrazolone-3-carboxylic acid | 4-anisidine | Aniline-4-sulfonic acid. |
| 8 | 1-(4'-aminophenyl)-5-pyrazolone-3-carboxylic acid ethyl ester | 4-bromine-aniline-2-sulfonic acid | 2-methyl-aniline-4-sulfonic acid. |

We claim:
1. A water-soluble polyazo-dyestuff of the formula

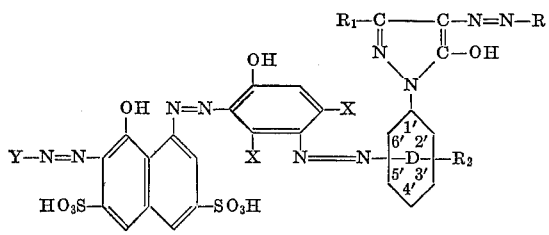

in which R and Y each represents phenyl, monosulfophenylene, methoxyphenylene, mono(sulfomethyl)-phenylene, monosulfomethyl-phenylene, monosulfo-bromophenylene, disulfophenylene or monosulfo-methyl-chlorophenylene, $R_1$ represents methyl, carboxyl or —COO-lower alkyl, $R_2$ represents hydrogen, methyl, chlorine or bromine, the azo grouping on the benzene nucleus D being linked in a position other than ortho to position 1', one X stands for hydrogen and the other X for hydroxyl.

2. The water-soluble polyazo-dyestuff of the formula

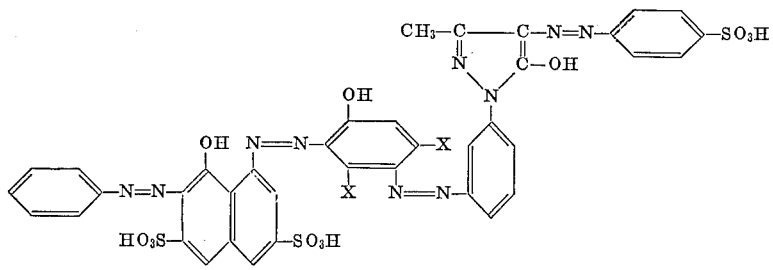

wherein one X stands for hydrogen and the other X for hydroxyl.

3. The water-soluble polyazo-dyestuff of the formula

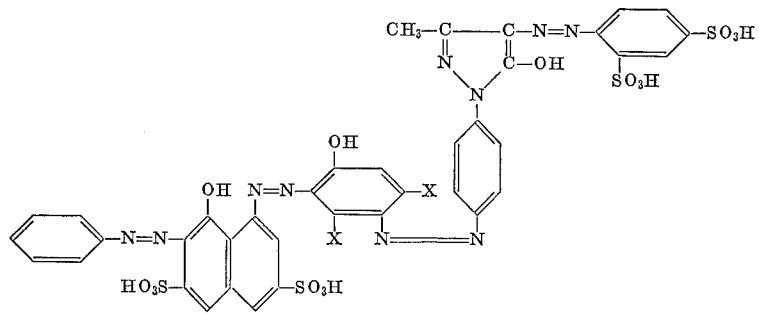

wherein one X stands for hydrogen and the other X for hydroxyl.

4. The water-soluble polyazo-dyestuff of the formula

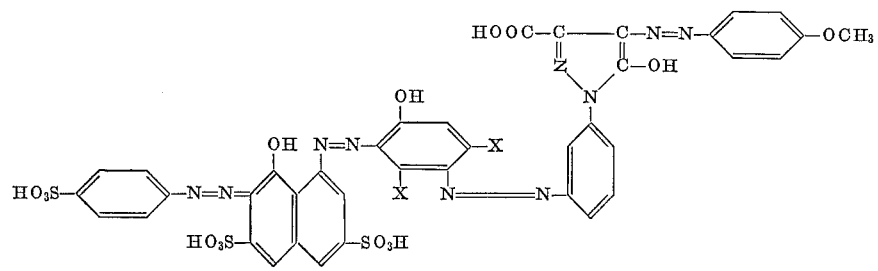

wherein one X stands for hydrogen and the other X for hydroxyl.

References Cited

UNITED STATES PATENTS

| | | | |
|---|---|---|---|
| 2,190,750 | 2/1940 | Zervas | 260—159 X |
| 2,447,222 | 8/1948 | Wehrli et al. | 260—159 X |
| 2,644,813 | 7/1953 | Ruckstuhl et al. | 260—159 X |
| 2,742,458 | 4/1956 | Langbein | 260—159 |
| 2,875,191 | 2/1959 | Benade et al. | 260—159 X |
| 3,078,266 | 2/1963 | Hanhart | 260—159 X |

FLOYD D. HIGEL, Primary Examiner

U.S. Cl. X.R.

8—10, 13; 260—160, 163, 200